United States Patent
Huang et al.

(10) Patent No.: US 10,875,998 B2
(45) Date of Patent: Dec. 29, 2020

(54) POLYCARBONATE COMPOSITIONS AND ARTICLES COMPRISING THE SAME

(71) Applicant: Covestro Deutschland AG, Leverkusen (DE)

(72) Inventors: Zhenyu Huang, Shanghai (CN); Xiaoxiang Wang, Shanghai (CN)

(73) Assignee: Covestro Deutschland AG, Leverkusen (DE)

( * ) Notice: Subject to any disclaimer, the term of this patent is extended or adjusted under 35 U.S.C. 154(b) by 55 days.

(21) Appl. No.: 16/319,916

(22) PCT Filed: Jun. 23, 2017

(86) PCT No.: PCT/EP2017/065556
§ 371 (c)(1),
(2) Date: Jan. 23, 2019

(87) PCT Pub. No.: WO2018/001901
PCT Pub. Date: Jan. 4, 2018

(65) Prior Publication Data
US 2019/0264025 A1 Aug. 29, 2019

(30) Foreign Application Priority Data
Jun. 27, 2016 (CN) .......................... 2016 1 0477918

(51) Int. Cl.
*C08L 69/00* (2006.01)
*C08L 9/06* (2006.01)
*C08L 45/00* (2006.01)

(52) U.S. Cl.
CPC ................. *C08L 69/00* (2013.01); *C08L 9/06* (2013.01); *C08L 45/00* (2013.01); *C08L 2203/206* (2013.01); *C08L 2205/03* (2013.01); *C08L 2207/53* (2013.01)

(58) Field of Classification Search
CPC .. C08L 69/00; C08L 45/00; C08L 9/06; C08L 2207/53
See application file for complete search history.

(56) References Cited

U.S. PATENT DOCUMENTS

| | | | |
|---|---|---|---|
| 5,097,002 A | 3/1992 | Sakashita et al. | |
| 5,340,905 A | 8/1994 | Kühling et al. | |
| 5,717,057 A | 2/1998 | Sakashita et al. | |
| 6,596,840 B1 | 7/2003 | Kratschmer et al. | |
| 6,740,730 B1 | 5/2004 | Kratschmer et al. | |
| 7,071,284 B2 | 7/2006 | Kauth et al. | |
| 7,091,267 B2 | 8/2006 | Venderbosch et al. | |
| 8,314,168 B2 | 11/2012 | Min et al. | |
| 2003/0181603 A1* | 9/2003 | Venderbosch ........... | C08L 69/00 525/461 |
| 2008/0029744 A1 | 2/2008 | Jansen et al. | |
| 2009/0312479 A1* | 12/2009 | Ren ........................ | C08L 69/00 524/451 |
| 2015/0183986 A1 | 7/2015 | Kim et al. | |

FOREIGN PATENT DOCUMENTS

| | | |
|---|---|---|
| JP | 4610905 B2 | 9/2005 |
| WO | WO-01005866 A1 | 1/2001 |
| WO | WO-01005867 A1 | 1/2001 |
| WO | WO-2004063249 A1 | 7/2004 |

OTHER PUBLICATIONS

International Preliminary Report on Patentability for PCT/EP2017/065556 dated Jan. 1, 2019.
International Search Report for PCT/EP2017/065556 dated Sep. 15, 2017.
Written Opinion of the International Searching Authority for PCT/EP2017/065556 dated Sep. 15, 2017.

* cited by examiner

*Primary Examiner* — Mark S Kaucher
(74) *Attorney, Agent, or Firm* — Faegre Drinker Biddle & Reath LLP

(57) ABSTRACT

This invention relates to polycarbonate compositions and articles comprising the same. The polycarbonate compositions comprise the following components: A) from 75 wt.-% to 97.5 wt.-% of a polycarbonate, B) from 1.5 wt.-% to 15 wt.-% of a flow promoter selected from alicyclic hydrocarbon resins, and C) from 1 wt.-% to 15 wt.-% of an impact modifier, in each case based on the total weight of the composition; wherein the composition comprises no polycarbonate-polysiloxane copolymer. The polycarbonate compositions of the present invention have good coating resistance, chemical resistance and impact properties as well as better flowability.

14 Claims, No Drawings

POLYCARBONATE COMPOSITIONS AND ARTICLES COMPRISING THE SAME

CROSS-REFERENCE TO RELATED APPLICATIONS

This application is a national stage application (under 35 U.S.C. § 371) of PCT/EP2017/065556, filed Jun. 23, 2016, which claims benefit of Chinese Application No. 201610477918.4, filed Jun. 27, 2016, both of which are incorporated herein by reference in their entirety.

TECHNICAL FIELD

The present invention relates to the technical field of impact-modified polycarbonate compositions having good chemical resistance and articles comprising the same.

BACKGROUND ART

Impact modified polycarbonate resins have been widely used in some equipment housings and electronic or electrical devices, such as mobile phones, laptops, adaptors/chargers, sockets, and switches. These materials provide good toughness to prevent the damage caused by dropping and hitting. Furthermore, they also possess higher heat resistance compared with other engineering plastics, such as HIPS, ABS, PC/ABS, etc., allowing them to survive higher working temperature in electrical devices.

Most of the housing parts in consumer electronic devices, such as mobile phones, need to be coated after injection molded. The coating materials usually contain some chemicals which are harmful to polycarbonate (PC), thereby dramatically affecting the mechanical properties of the PC materials negatively. Due to the short chain length and intermediate polarity, polycarbonate molecules have high affinity to many organic solvents. Furthermore, since PC is an amorphous material, it is easier for polycarbonate to be penetrated by small molecule chemicals of the coating materials compared with semi-crystalline polymeric materials, such as nylon, polyethylene (PE), polypropylene (PP), and polyester, e.g., polybutylene terephthalate (PBT), polyethylene glycol terephthalate (PET), etc. As a consequence, these solvents might enter into some small crazes in the PC resin, further expand the craze, and finally lead to big cracks under the external force. All of these factors make PC a material with poor chemical and coating resistance. The impact properties are reduced significantly after a coating is applied to the molded parts comprising such PC. This leads to the failure to pass the drop test for the molded housing parts or assembled electric devices using this polycarbonate material as housing.

The coating and chemical resistance of impact modified PC using regular impact modifiers, such as methyl methacrylate-butadiene-styrene copolymers (MBS), acrylate rubber based, and most of silicone/acrylate rubber based core-shell structure impact modifiers, are not satisfying.

A common way to improve chemical resistance is to mix PC with polyester (e.g., PBT, PET, or any polyester copolymers). Due to the semi-crystalline property of many polyesters, the chemical resistance can be improved greatly. However, adding polyester into PC leads to lower heat distortion temperature and thus may limit the applications, if high working temperature is required. Lower impact strength at low temperatures is another disadvantage of such PC/polyester blend systems.

Another effective way to improve the chemical and coating resistance of polycarbonate materials is to increase the molecular weight of polycarbonate materials. However, this method reduces the flowability of the polycarbonate materials and thus affects the processability of polycarbonate materials, especially for those large injection molded parts or thin wall parts.

On the other hand, adding known flow promotors into PC resins provides enhanced flowability, but the chemical resistance and impact properties are affected. For example, some low molecular weight styrene-acrylonitrile (SAN) copolymer resins are usually used to improve the flowability of polycarbonate, but this reduces the chemical resistance of polycarbonate and also influences the impact properties of polycarbonate.

Specifically, in U.S. Pat. No. 8,314,168 B2, syndiotactic polystyrene (SPS) is added into polycarbonate system impact modified by MBS or silicone/acrylate rubber-based core-shell impact modifiers. A phosphate ester, such as PX-200 or TPP, is also added to improve flowability. The chemical resistance is improved due to the crystalline structure of SPS and its good miscibility with polycarbonate resins. However, it is expected that low temperature impact properties are sacrificed with the addition of SPS.

In conclusion, although the flowability, impact properties and/or chemical resistance of polycarbonate compositions have been improved by various methods in the foregoing documents, it cannot be ensured that the good impact properties can still be maintained when these compositions are particularly applied in articles and are subjected to coating processes. Thus, there is a need to develop a polycarbonate composition having good coating resistance and with no obvious adverse effect on other properties.

SUMMARY OF THE INVENTION

In view of this, the present invention provides a polycarbonate composition comprising the following components:
A) from 75 wt.-% to 97.5 wt.-% of a polycarbonate,
B) from 1.5 wt.-% to 15 wt.-% of a flow promoter selected from the group consisting of alicyclic hydrocarbon resins, and
C) from 1 wt.-% to 15 wt.-% of an impact modifier, wherein the composition comprises no polycarbonate-polysiloxane copolymer, preferably no polycarbonate copolymer.

In each case, the amounts are based on the total weight of the composition, and the sum of all components contained is 100 wt.-%.

By a synergistic effect of the individual components, the present invention improves the coating resistance of impact-modified polycarbonate compositions while there preferably is no adverse effect on other properties, as, e.g., impact properties.

The present invention further provides an article comprising said polycarbonate composition. Preferably, the article is made from the composition and even more preferred consists of a molded article made from the composition and one or more coating layers, in particular comprising a UV absorber and/or a scratch resistant coating.

DETAILED DESCRIPTION OF THE EMBODIMENTS

Polycarbonate compositions according to the invention comprise the following components:

A) from 75 wt.-% to 97.5 wt.-% of a polycarbonate, preferably an aromatic polycarbonate, B) from 1.5 wt.-% to 15 wt.-% of a flow promoter selected from the group consisting of alicyclic hydrocarbon resins, and C) from 1 wt.-% to 15 wt.-% of an impact modifier, wherein the composition comprises no polycarbonate-polysiloxane copolymer, preferably no polycarbonate copolymer.

The amounts are in each case based on the total weight of the composition, and the total amount of all components contained is 100 wt.-%.

"Preferably comprising no polycarbonate copolymer" means that the composition according to the present invention preferably does not contain, in addition to polycarbonate-polysiloxane copolymer, any other polycarbonate copolymer, e.g. no modified or grafted copolymer of polycarbonate, polyester-polycarbonate copolymers, etc.

Preferably, the polycarbonate composition comprises, in addition to the above-described components A) to C), other components routinely used in the art (such as additives and/or auxiliaries) in conventional amounts.

To further illustrate the present invention, components of this invention are described in more detail below.

Polycarbonate

Polycarbonates in the context of the present invention are preferably aromatic polycarbonates; the polycarbonates may, in a known manner, be linear or branched. According to the invention, it is also possible to use mixtures of polycarbonates.

In the present invention, the polycarbonate preferably has a weight average molecular weight ($M_w$) of from 10,000 to 200,000 g/mol, more preferably from 15,000 to 80,000 g/mol, and particularly preferably from 24,000 to about 32,000 g/mol, determined by means of Gel Permeation Chromatography (GPC) in methylene chloride at 25° C. using a polycarbonate standard.

Preferably, the polycarbonate is a linear thermoplastic aromatic polycarbonate. More preferably, the linear thermoplastic aromatic polycarbonate has a weight average molecular weight ($M_w$) of from 10,000 to 200,000 g/mol, preferably from 15,000 to 80,000 g/mol, and particularly preferably from 24,000 to 32,000 g/mol. The weight average molecular weight ($M_w$) was determined by means of Gel Permeation Chromatography (GPC) in methylene chloride at 25° C. using a polycarbonate standard.

The polycarbonate can be produced from diphenol, a carbonic acid derivative and optionally a chain terminator in a known manner. Dihydroxyaryl compounds suitable for the preparation of polycarbonates include those of formula (1):

$$HO-Z-OH \quad (1),$$

wherein Z is an aromatic radical having 6 to 30 carbon atoms, which may contain one or more aromatic rings, may be substituted and may contain aliphatic or alicyclic groups and/or alkylaryls or hetero atoms as bridging moieties.

Z in the formula (1) is preferably a radical of formula (2):

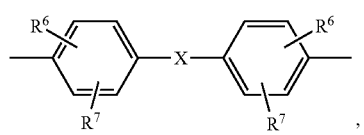

(2)

wherein $R^6$ and $R^7$, independently of one another, are H, $C_1$ to $C_{18}$-alkyl, $C_1$ to $C_{18}$-alkoxy, halogen (e.g., Cl or Br), aryl, or arylalkyl, each of which being optionally substituted; preferably are H or $C_1$ to $C_{12}$-alkyl; more preferably are H or $C_1$ to $C_8$-alkyl; and very preferably are H or methyl; and X is a single bond, —$SO_2$—, —CO—, —O—, —S—, $C_1$ to $C_6$-alkylene, $C_2$ to $C_5$-alkylidene, or $C_5$ to $C_6$-cycloalkylidene, which may be substituted by $C_1$ to $C_6$-alkyl (preferably methyl or ethyl); or also is $C_6$ to $C_{12}$-arylene, which may optionally be fused with aromatic rings containing other hetero atoms.

X preferably is a single bond, $C_1$ to $C_5$-alkylene, $C_2$ to $C_5$-alkylidene, $C_5$ to $C_6$-cycloalkylidene, —O—, —SO—, —CO—, —S— or —$SO_2$—; or a radical of formula (2):

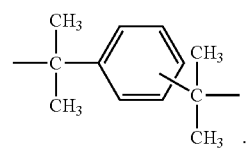

(2b)

Examples of diphenols suitable for producing polycarbonates used according to the present invention include hydroquinone, resorcinol, dihydroxydiphenyl, bis(hydroxyphenyl)alkanes, bis(hydroxyphenyl)cycloalkanes, bis-(hydroxyphenyl)sulfides, bis(hydroxyphenyl)ethers, bis(hydroxyphenyl)-ketones, bis(hydroxyphenyl)-sulfones, bis(hydroxyphenyl)-sulfoxides, bis(hydroxyphenyl)diisopropylbenzenes, and alkylated, cyclo-alkylated and cyclo-halogenated compounds thereof.

Preferred diphenols are 4,4'-dihydroxydiphenyl, 2,2-bis(4-hydroxyphenyl)-1-phenyl-propane, 1,1-bis(4-hydroxyphenyl)phenylethane, 2,2-bis(4-hydroxyphenyl)propane, 2,4-bis(4-hydroxyphenyl)-2-methylbutane, 1,3-bis [2-(4-hydroxyphenyl)-2-propyl]benzene (bisphenol M), 2,2-bis(3-methyl-4-hydroxyphenyl)propane, bis(3,5-dimethyl-4-hydroxyphenyl) methane, 2,2-bis(3,5-dimethyl-4-hydroxyphenyl)propane, bis(3,5-dimethyl-4-hydroxyphenyl)sulfone, 2,4-bis(3,5-dimethyl-4-hydroxyphenyl)-2-methylbutane, 1,3-bis [2-(3,5-dimethyl-4-hydroxyphenyl)-2-propyl]benzene, and 1,1-bis(4-hydroxyphenyl)-3,3,5-trimethylcyclohexane (bisphenol TMC).

Particularly preferred diphenols are 4,4'-dihydroxydiphenyl, 1,1-bis(4-hydroxyphenyl)phenylethane, 2,2-bis(4-hydroxyphenyl)propane, 2,2-bis(3,5-dimethyl-4-hydroxyphenyl)propane, 1,1-bis(4-hydroxyphenyl)-cyclohexane, and 1,1-bis(4-hydroxyphenyl)-3,3,5-trimethylcyclohexane (bisphenol TMC).

In the case of homopolycarbonates, only one diphenol is used. The diphenol used as well as all of the other auxiliaries and chemicals added to the synthesis might be contaminated by impurities resulted from synthesis, treatment or storage of itself. However, it is desired to operate with extremely pure raw materials.

As the mono-functional chain terminator needed for modulating the molecular weight, phenols or alkyl phenols, especially phenols, p-tert-butylphenols, iso-octylphenols, cumylphenol, and chloro-carbonates thereof, or acyl chlorides of mono-carboxylic acids, and/or mixtures of these chain terminators are useful.

Preferred methods for producing polycarbonates employed according to the present invention include known interface processes and known melt transesterification processes (see, for example, WO 2004/063249 A1, WO 2001/05866 A1, WO 2000/105867, U.S. Pat. Nos. 5,340,905 A, 5,097,002 A, and 5,717,057 A). In the first case, the acid derivative preferably is phosgene and optionally dicarboxylic acid dichloride. The catalysts, solvents, aftertreatment, reaction conditions and the like employed for producing polycarbonates have been extensively described and are well-known in the art. Polycarbonates may be aftertreated in a known manner, for example, being processed into any desired type of moldings by means of extrusion or injection molding.

The polycarbonate can be prepared by known processes or obtained from the market, e.g., PC Makrolon® 2600 and PC Makrolon® 2800 available from Covestro.

In the present invention, the polycarbonate composition comprises from 75 wt.-% to 97.5 wt.-%, preferably from 80 wt.-% to 97 wt.-%, more preferably from 85 wt.-% to 96.5 wt.-%, even more preferably from 87 to 95 wt.-% polycarbonate, in particular aromatic polycarbonate, based on the total weight of the composition.

Flow Promoter—Alicyclic Hydrocarbon Resin

Preferably, the alicyclic hydrocarbon resin has a number average molecular weight ($M_n$) of from 500 to 5,000 g/mol, preferably from 750 to 3,500 g/mol, and more preferably from 850 to 1,500 g/mol, determined by GPC method (solvent chloroform, calibration with monodisperse molecular weight polystyrene). Preferably, the softening point of the flow promoter is in a range between 70° C. and 150° C., measured according to ASTM E28-67 (R&B).

More preferably, particularly useful resins are low molecular weight hydrocarbon resins derived from unsaturated $C_5$ to $C_9$ monomers. "Low" in this context means a molecular weight ($M_n$) up to 5,000 g/mol (included). Non-limiting examples for the monomers include cyclic olefins and diolefins, e.g. cyclopentene, cyclopentadiene, cyclohexene, cyclohexadiene, methyl cyclopentadiene and the like; and cyclic diolefins, e.g., dicyclopentadiene, methylcyclopentadiene dimer and the like.

The resins can additionally be partially or fully hydrogenated. Exemplary commercial low molecular weight hydrocarbon resins may include the following: hydrocarbon resins available from Eastman Chemical under the trademark Piccotac®; the fully hydrogenated alicyclic hydrocarbon resin available from Arakawa Chemical Inc. under the trademark Arkon® and sold, depending on softening point, as Arkon® P140, P125, P115, P100, P90, P70 or the partially hydrogenated hydrocarbon resins sold as Arkon® M135, M115, M100 and M90; the fully or partially hydrogenated hydrocarbon resin available from Eastman Chemical under the tradename Regalite® and sold, depending on softening point, as Regalite® R1100, 51100, R1125, R1090 and R1010 or the partially hydrogenated resins sold as Regalite® R7100, R9100, 55100 and 57125; the hydrocarbon resins based on $C_5$, $C_9$ raw materials and mixtures thereof available from Exxon Chemical under the tradename Escorez®, sold as the Escorez® 1000, 2000 and 5000 series or the hydrocarbon resins based on cyclic and $C_9$ monomers, which are optionally hydrogenated, sold as the Escorez® 5300, 5400 and 5600 series.

Even further preferred, alicyclic saturated hydrocarbon resins are used having the following structural unit (3):

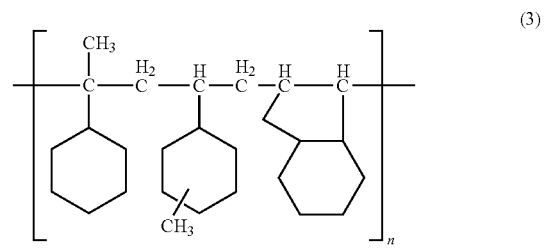

The alicyclic saturated hydrocarbon resin with the structural unit (3) preferably has a polymerization degree n of from 2 to 8, and more preferably of 3. Such resins are, for example, available from Arakawa Chemical Industries, under the tradename Arkon™, having a number average molecular weight of about 1150 g/mol, determined by GPC method. The softening point of the flow promoter preferably is in a range between 70° C. and 150° C., measured according to ASTM E28-67 (R&B). It can be odorless and colorless, and have good weather resistance.

In the present invention, the composition contains from 1.5 wt.-% to 15 wt.-%, preferably from 2.5 wt.-% to 10 wt.-% particularly preferred from 2.0 to 5.0 wt.-% alicyclic saturated hydrocarbon resin, the amounts referring to the total weight of the composition.

Impact Modifier

Preferably, the impact modifier is selected from one or more of the following: butadiene- or styrene-butadiene rubber-based and methyl methacrylate-styrene-grafted impact modifiers having a core-shell structure (MBS), siloxane-acrylate rubbers having a core-shell structure, acrylate rubber-based core-shell impact modifiers, and the like.

Butadiene- or Styrene-Butadiene Rubber-Based and Methyl Methacrylate-Styrene-Grafted Impact Modifiers Having a Core-Shell Structure (MBS)

It is preferred that the butadiene- or styrene-butadiene rubber-based core-shell impact modifiers are butadiene- or styrene-butadiene rubber-based impact modifiers grafted with methyl methacrylate or methyl methacrylate-styrene copolymers, e.g., Kane Ace M732 available from Kaneka Japan and Paraloid™ EXL2650J, EXL2690 and EXL2691J available from Dow Chemicals, and the like.

Siloxane-Acrylate Rubbers Having a Core-Shell Structure

Suitable siloxane-acrylate rubbers having a core-shell structure may be produced from alkyl methacrylates and/or alkyl acrylates, crosslinkers, and grafting agents. In this context, exemplary and preferred alkyl methacrylates and/or alkyl acrylates are $C_1$ to $C_5$-alkyl esters, e.g., methyl ester, ethyl ester, n-butyl ester, tert-butyl ester, n-propyl ester, n-hexyl ester, n-octyl ester, n-lauryl ester, and 2-ethylhexyl ester; haloalkyl esters, preferably halo $C_1$ to $C_5$-alkyl esters, e.g., chloroethyl acrylate, and mixtures of these monomers. Particularly preferred is n-butyl acrylate.

A monomer having more than one polymerizable double bond can be used as the crosslinker for the polyalkyl(meth)acrylate-rubber component of siloxane-acrylate rubber. Preferred examples of the crosslinking monomers are esters of unsaturated mono-carboxylic acids having 3 to 8 carbon atoms and unsaturated monohydric alcohols having 3 to 12 carbon atoms or saturated polyols having 2 to 4 OH-groups and 2 to 20 carbon atoms, e.g., ethylene glycol dimethacrylate, propanediol dimethacrylate, 1,3-butanediol dimethacrylate, and 1,4-butanediol dimethacrylate. Such crosslinkers may be used alone or as mixtures of at least two crosslinkers.

Exemplary and preferred grafting agents are allyl methacrylate, triallylcyanurate, triallylisocyanurate or mixtures thereof. The allyl methacrylate may further be used as the crosslinker. Such grafting agents may be used alone or as mixtures of at least two grafting agents.

The crosslinker and grafting agent are present in an amount of from 0.1 wt.-% to 20 wt.-% based on the total weight of the polyalkyl(meth)acrylate-rubber component of siloxane-acrylate rubber.

The siloxane-acrylate rubber is produced in the form of an aqueous latex. Subsequently, to the latex alkyl methacrylates and/or alkyl acrylates, crosslinkers and grafting agents are added, and then polymerization is carried out. Preferred polymerization is free-radical initiated emulsion polymerization, which for example is initiated by peroxides, azos or redox initiators. It is particularly preferred to use a redox initiator system, especially a sulfoxylate initiator system, which is obtained from a combination of ferric sulfate, disodium methylenediamine tetraacetate, rongalite, and hydroperoxide.

The grafting agent used for producing the siloxane rubber leads to the covalent bonding of the polyalkyl(meth)acrylate-rubber component with the siloxane-rubber component. During the polymerization process, the two rubber components penetrate into each other and form a composite rubber, which will not be separated into its constituent components after polymerization.

Preferred siloxane-acrylate rubbers suitable to be used are, for example, Metablen S-2100, S-2001, S-2006 and the like available from Mitsubishi Rayon.

The compositions according to the invention comprise the siloxane-acrylate rubber impact modifier preferably in an amount of from 1 wt.-% to 8 wt.-%, and more preferably from 1 wt.-% to 6 wt.-%, particularly preferred from 2.0 to 5.0 wt.-% of the total weight of the composition.

Acrylate Rubber-Based Core-Shell Impact Modifier

It is preferred that the acrylate rubber-based core-shell impact modifiers are acrylate rubber-based impact modifiers grafted with methyl methacrylate, including Paraloid™ EXL2311, EXL2313, EXL2315, EXL2300, EXL2330 and EXL2390 available from Dow Chemicals; and Durastrength® 410, 440 and 480 available from Arkema.

The compositions according to the invention comprise the acrylate rubber-based core-shell impact modifier preferably from 1 wt.-% to 8 wt.-% and more preferably from 1 wt.-% to 6 wt.-%, particularly preferred from 2.0 to 5.0 wt.-% based on the total weight of the composition.

The above-described impact modifiers can be used alone or in combination. If used in combination, the overall amount of impact modifiers preferably is 1 wt.-% to 8 wt.-% and more preferably from 1 wt.-% to 6 wt.-%, particularly preferred from 2.0 to 5.0 wt.-%.

Additional Components

The polycarbonate compositions according to the invention preferably comprise additional components conventionally used for thermoplastic polymers in conventional amounts, for example, additives. More preferably, the additives are used in an amount ranging from 0.5 wt.-% to 15 wt.-based, even more preferably 0.6 wt.-% to 10 wt.-%, particularly preferred 0.7 wt.-% to 3 wt.-%, based on the total weight of the composition.

The additional components may be selected from one or more of the following: mold release agents, flame retardants, fillers, anti-oxidants and/or heat stabilizers, antistatic agents, colorants, pigments, UV absorbers, IR absorbers, and the like. Most preferably, the compositions according to the invention do not comprise any further components than components A, B and C as well as one or more of the additives selected from the group consisting of mold release agents, flame retardants, fillers, heat stabilizers, antistatic agents, colorants, pigments, UV absorbers, IR absorbers.

Examples of suitable anti-oxidants or heat stabilizers are alkylated monophenols, alkylthiomethylphenols, hydroquinones, and alkylated hydroquinones, tocopherols, hydroxylated thiodiphenyl ethers, alkylidene bisphenols, O-, N- and S-benzyl compounds, hydroxybenzylated malonates, aromatic hydroxybenzyl compounds, triazine compounds, acylaminophenols, β-(3,5-di-tert-butyl-4-hydroxyphenyl)propionates, β-(5-tert-butyl-4-hydroxy-3-methylphenyl) propionates, β-(3,5-di-cyclohexyl-4-hydroxyphenyl) propionates, 3,5-di-tert-butyl-4-hydroxyphenylacetates, β-(3,5-di-tert-butyl-4-hydroxyphenyl)propionic acid amides, suitable thiosynergists, secondary anti-oxidants, phosphites, phosphinates, benzofuranones, and indolones. The preferred anti-oxidants or heat stabilizers are organophosphites, such as triphenylphosphine, tri-(tolyl)-phosphine, or 2,4,6-tri (tert-butyl) phenoxyl phosphates-phosphonates and phosphane, and generally are those whose organic groups are completely or partially constituted by optionally substituted aromatic groups. IRGANOX 1076 (Octadecyl 3-(3,5-di-tert-butyl-4-hydroxyphenyl)propionate, CAS No. 2082-79-3) and/or triphenylphosphine (TPP) are particularly suitable.

Examples of suitable mold release agents are monohydric alcohols such as stearyl alcohols, palmityl alcohols and/or Guerbet alcohols; dihydric alcohols such as ethylene glycol; trihydric alcohols such as glycerol; tetrahydric alcohols such as pentaerythriol and/or mesoerythritol; pentahydric alcohols such as arabitol, adonitol, and/or xylitol; and hexahydric alcohols such as mannitol, glucitol (sorbitol), and/or galactitol. Particularly suitable are esters or partial esters of glycerol, pentaerythriol, and/or Guerbet alcohols. The esters are preferably mono-, di-, tri-, tetra-, penta-, and/or hexa-esters of saturated aliphatic $C_{10}$-$C_{36}$ monocarboxylic acids and optionally hydroxy monocarboxylic acids, more preferably saturated aliphatic $C_{14}$-$C_{32}$ monocarboxylic acids and optionally hydroxy monocarboxylic acids or mixtures thereof. Examples of saturated aliphatic monocarboxylic acids having 10 to 36 carbon atoms are capric, lauric, myristic, palmitic, stearic, hydroxystearic, arachidic, behenic, lignoceric, cerotic, and montanic acids. PETS (pentaerythritol tetrastearate) is a common mold release agent used for polycarbonate resins for facilitating the blending process and assisting release of the molded parts from the mold.

Other additives and the amounts thereof can be used as those known by the skilled in the art and appropriately adjusted when necessary.

Preferably, the polycarbonate composition comprises the following components:

A) from 85 wt.-% to 97.5 wt.-% of a polycarbonate,

B) from 1.5 wt.-% to 10 wt.-% of a flow promoter selected from the group consisting of alicyclic hydrocarbon resins, and C) from 1 wt.-% to 8 wt.-% of an impact modifier, wherein the composition comprises no polycarbonate-polysiloxane copolymer, in particular no polycarbonate copolymer. The amounts in each case are based on the total weight of the composition, and the sum of all components, including optional additional components, is 100 wt.-%.

Preferably, the compositions according to the invention do not contain any polyester and/or further flow promoters than component B, in particular no syndiotactic polystyrene.

Particularly preferred compositions are those consisting of
A) from 85 wt.-% to 97 wt.-% of an aromatic polycarbonate,
B) from 1.5 wt.-% to 5.0 wt.-%, very particularly preferred from 2.0 wt.-% to 5.0 wt.-% of a flow promoter selected from the group consisting of alicyclic hydrocarbon resins, and
C) from 1 wt.-% to 5 wt.-%, very particularly preferred from 2.0 wt.-% to 5.0 wt.-% of an impact modifier,
D) from 0.5 wt.-% to 10 wt.-% of one or more conventional additives selected from the group consisting of mold release agents, flame retardants, fillers, anti-oxidants, heat stabilizers, antistatic agents, colorants, pigments, UV absorbers, IR absorbers.

The above-described embodiments and preferred embodiments can be combined in any way to obtain other embodiments.

The polycarbonate composition of the present invention can be prepared and used according to conventional methods that are known to those skilled in the art. For example, it may be prepared by a method comprising the following steps:
1) pre-mixing an impact modifier with other additives (such as mold release agents) to obtain a pre-mixed mixture;
2) mixing the pre-mixed mixture with other components; and
3) pelletizing by, for example, a twin-screw extruder to obtain pellets.

The polycarbonate composition according to the present invention can be manufactured into a variety of articles suitable for use in the electronic and electric field, preferably as housings or parts of housing of electronic and electric parts. Coated articles made from such a composition can still retain their impact properties.

Preferred articles comprising or consisting of the polycarbonate compositions are plastic parts used in mobile phones, laptops, adaptors, chargers, sockets or switches.

Methods for preparing the articles of the present invention preferably include one or more of the following steps: molding, extruding, forming.

EXAMPLES

The composition formulations and effects of the present invention are further illustrated by the following examples.

"%" in each case refers to percentage by weight unless otherwise indicated. The weight average molecular weight ($M_w$) and number average molecular weight ($M_n$) as mentioned herein are determined by means of Gel Permeation Chromatography (GPC) in methylene chloride at 25° C. using a polycarbonate standard, unless specified otherwise.

Sources and Characteristics of the Raw Materials

A. Polycarbonates

PC Makrolon® 2600, a linear Bisphenol A based polycarbonate having a weight average molecular weight of about 26,000 g/mol available from Covestro.

PC Makrolon® 2800, a linear Bisphenol A based polycarbonate having a weight average molecular weight of about 28,000 g/mol available from Covestro.

B. Flow Promoters—Alicyclic Hydrocarbon Resins

Arkon® Arkon P-125 (Arakawa Chemical, Japan), with a weight average molecular weight of 1730 and a number average molecular weight of 870 g/mol, determined by GPC method (solvent chloroform, calibration with monodisperse molecular weight polystyrene), and a softening point of 125° C., measured according to ASTM E28-67 (R&B).

Arkon® Arkon P-140 (Arakawa Chemical, Japan), with a weight average molecular weight of 2220 and a number average molecular weight of 1060 g/mol, determined by GPC method (solvent chloroform, calibration with monodisperse molecular weight polystyrene), and a softening point of 140° C., measured a ASTM E28-67 (R&B)

Copolymer. Flow Promoter, but No alicyclic Hydrocarbon Resin

Metablen TP003, a phenylmethacrylate-styrene-acrylonitrile copolymer manufactured by Mitsubishi Rayon Co. Ltd.

C. Impact Modifiers

Kane Ace M732 (Kaneka Japan), with a styrene-butadiene rubber as the rubber core, a rubber amount of around 70%, a methyl methacrylate-styrene copolymer being the grafting phase, and a particle size ranging between 150 nm and 200 nm.

Metablen S-2001 (Mitsubishi Rayon, Japan), with a siloxane-acrylate copolymer as the rubber core and methyl methacrylate being the grafting phase.

Paraloid® EXL2311 (Dow Chemical), with an acrylate copolymer as the rubber core and methyl methacrylate being the grafting phase.

D. Mold Release Agent

PETS, pentaerythritol tetrastearate, manufactured by FACI Asia Pacific PTE Ltd.

Coating

Commercially available UV paint. Beckers um8CA-0090, manufactured by Becker's Painting Company.

Testing Methods:
1. The flowability is characterized by melt volume flow rate (MVR), which was measured under the conditions 300° C./1.2 kg according to ISO 1133-1:2011.
2. IZOD notched impact strength of the Inventive Examples and Comparative Examples was measured at two different temperatures (23° C. and −20° C.) according to ISO180/A:2000. The samples were prepared by injection molding having the dimension of 80 mm×10 mm×3 mm. The radius of notch was 0.25 mm. 10 specimens were tested under each experimental condition. The impact strength values are shown together with the break type (P or C) in Table 1. P stands for partial break, indicating the ductile behavior. C stands for complete break, corresponding to the brittle behavior.
3. The coating resistance was characterized by measuring the difference of maximum force and the puncture energy in multiple-axial impact (MAI) test before and after coating for the Inventive Examples and Comparative Examples. The paints for coating, as described above, were obtained from the market.

The multiple-axial impact (MAI) test, according to ISO 6603-2:2000, is designated to test resistance of the material surface to damage caused by high-speed impact and it can better simulate the field test of the housing materials, such as Falling Dart Impact or Full-scale Free Dropping Experiment. In the experimental evaluation of the coating resistance according to the present invention, the multiple-axial impacted sample sheets (100 mm×100 mm×15 mm) prepared by injection molding were dried overnight after sprayed with UV paint. The coating layer had a thickness of from 0.1 mm to 0.2 mm. The multiple-axial impact test was conducted on the second day to compare the changes of the maximum force and the puncture energy in multiple-axial impact (MAI) test before and after coating, thereby evaluating the coating resistance of the material.

The polycarbonate compositions were prepared by blending and pelletizing based on the formulations shown in Tables 1 to 3 and tested for their properties using the methods as listed above. The results are recorded in Tables 1 to 3.

TABLE 1

The compositions and properties (MVR at 300° C./1.2 kg, IZOD notched impact strength at 23° C. and −20° C., and the multiple axial impact (MAI) maximum force and puncture energy before and after coating) of the Comparative Examples

| | | Comparative Examples | | | | | | | |
|---|---|---|---|---|---|---|---|---|---|
| | Components | 1 | 2 | 3 | 4 | 5 | 6 | 7 | 8 |
| A(wt.-%) | PC Makrolon ® 2600 | 99.4 | | | | 96.4 | | | 96.4 |
| | PC Makrolon ® 2800 | | 99.4 | 98.4 | | | 96.4 | 95.4 | 96.4 |
| B(wt.-%) | Arkon ® P-125 | | | 1 | | | 1 | | |
| C(wt.-%) | Kane Ace M732 | | | | 3 | 3 | 3 | | |
| | Metablen S-2100 | | | | | | | 3 | |
| | Paraloid ® EXL-2311 | | | | | | | | 3 |
| D(wt.-%) | PETS | 0.6 | 0.6 | 0.6 | 0.6 | 0.6 | 0.6 | 0.6 | 0.6 |

| | | Comparative Examples | | | | | | | |
|---|---|---|---|---|---|---|---|---|---|
| Testing Items | Testing Conditions | 1 | 2 | 3 | 4 | 5 | 6 | 7 | 8 |
| MVR (cm³/(10 min)) | 300° C., 1.2 kg | 14.1 | 10.0 | 11.2 | 9.6 | 8.3 | 8.7 | 9.1 | 11.0 |
| Izod notched impact strength (kJ/m²), 3 mm | 23° C. | 66P | 67P | 67P | 65P | 65P | 61P | 65P | 64P |
| | −20° C. | 11C | 12C | 12C | 56P | 56P | 56P | 51P | 57P |
| MAI Maximum Force (N) | Before coating | 5267 | 5328 | 5384 | 5081 | 5088 | 5184 | 5171 | 5143 |
| | After coating | 514 | 621 | 728 | 4232 | 4257 | 4299 | 2644 | 4522 |
| | Change rate % | −90.2 | −88.3 | −86.5 | −16.7 | −16.3 | −17.1 | −48.9 | −12.1 |
| MAI Puncture Energy (J) | Before coating | 56.1 | 56.3 | 56.0 | 54.1 | 53.1 | 58.1 | 54 | 50.6 |
| | After coating | 1.7 | 2.2 | 1.9 | 31.7 | 32.1 | 33.2 | 24 | 34.4 |
| | Change rate % | −97.0 | −96.1 | −96.7 | −41.4 | −39.5 | −42.9 | −55.6 | −32.0 |

Table 1 shows the Comparative Examples of polycarbonate materials with or without impact modifiers that do not use alicyclic hydrocarbon resin or only use 1% of alicyclic hydrocarbon resin (Arkon P-125). As is clearly shown, the MAI performance is sacrificed a lot after coating the articles of comparative examples, especially the articles of virgin polycarbonate without impact modifier (Comparative Examples 1 and 2). For impact modified polycarbonate resins (Comparative Examples 4 to 8), the coating resistance is improved, but around 32% to 55% puncture energy is still lost after coating. In addition, adding only 1% of alicyclic hydrocarbon resin (Arkon P-125) into both impact modified (comparative example 6) and non-impact modified (comparative example 3) polycarbonate resins does not help the coating resistance.

TABLE 2

The compositions and properties (MVR at 300° C./1.2 kg, IZOD notched impact strength at 23° C. and −20° C., and the multiple axial impact (MAI) maximum force and puncture energy before and after coating) of the Comparative Examples

| | | Comparative Examples | | |
|---|---|---|---|---|
| | Components | 9 | 10 | 11 |
| A(wt.-%) | PC Makrolon ®2600 | | 93.4 | |
| | PC Makrolon ®2800 | 93.4 | | 93.4 |
| B(wt.-%) | Arkon ®P-125 | | | |
| | Arkon ®P-140 | | | |
| Copolymer(wt.-%) | Metablen TP003 | 3 | 3 | 3 |
| C(wt.-%) | Kane Ace M732 | | | |
| | Metablen S-2100 | 3 | | |
| | Paraloid ® EXL-2311 | | 3 | 3 |
| D(wt.-%) | PETS | 0.6 | 0.6 | 0.6 |

TABLE 2-continued

The compositions and properties (MVR at 300° C./1.2 kg, IZOD notched impact strength at 23° C. and −20° C., and the multiple axial impact (MAI) maximum force and puncture energy before and after coating) of the Comparative Examples

| | | Comparative Examples | | |
|---|---|---|---|---|
| Testing Items | Testing Conditions | 9 | 10 | 11 |
| MVR(cm³/(10 min)) | 300° C., 1.2 kg | 10 | 11.4 | 10 |
| Izod notched impact strength (kJ/m²), 3 mm | 23° C. | 61P | 58P | 64P |
| | −20° C. | 32C | 27C | 21C |
| MAI Maximum Force (N) | Before coating | 5067 | 4985 | 5105 |
| | After coating | 4573 | 4799 | 5006 |
| | Change rate % | −9.7 | −3.7 | −1.9 |
| MAI Puncture Energy (I) | Before coating | 52 | 48.5 | 53.4 |
| | After coating | 37 | 45.0 | 48.4 |
| | Change rate % | −28.8 | −7.2 | −9.5 |

Table 2 shows the composition and testing results after the addition of Copolymer TP003 into the composition of the present invention. In some cases, TP003 can be used as a flow promoter like the alicyclic hydrocarbon resin in a thermoplastic composition to improve the flowability of the composition. Nevertheless, as can be seen from the testing results shown in Comparative Examples 9 to 11, the addition of TP003 improves the MAI performance, but still impairs the IZOD notched impact strength at a low temperature even with the use of an impact modifier in combination. This on one hand indicates the performance of the inventive composition is sacrificed after the addition of other flow promoters, and on the other hand suggests that the alicyclic hydrocarbon resin flow promoter as one component of the inventive composition is irreplaceable.

TABLE 3

The compositions and properties (MVR at 300° C./1.2 kg, IZOD notched impact strength at 23° C. and −20° C., and the multiple axial impact (MAI) maximum force and puncture energy before and after coating) of the Inventive Examples

| | | Inventive Examples | | | |
|---|---|---|---|---|---|
| Components | | 1 | 2 | 3 | 4 |
| A(wt.-%) | PC Makrolon ® 2600 | | | 93.4 | |
| | PC Makrolon ® 2800 | 93.4 | 92.4 | | 93.4 |
| B(wt.-%) | Arkon ® P-125 | 3 | 4 | 3 | 3 |
| | Arkon ® P-140 | | | | |
| C(wt.-%) | Kane Ace M732 | 3 | 3 | | |
| | Metablen S-2100 | | | 3 | |
| | Paraloid ® EXL-2311 | | | | 3 |
| D(wt.-%) | PETS | 0.6 | 0.6 | 0.6 | 0.6 |
| Testing Items | Testing Conditions | | | | |
| MVR (cm$^3$/(10 min)) | 300° C., 1.2 kg | 9.6 | 9.8 | 12.90 | 11 |
| Izod notched impact strength (kJ/m$^2$), 3 mm | 23° C. | 58P | 60P | 59P | 64P |
| | −20° C. | 48P | 53P | 47P | 53P |
| MAI Maximum Force (N) | Before coating | 4867 | 4891 | 4678 | 4933 |
| | After coating | 4693 | 4753 | 4560 | 4796 |
| | Change % | −3.6 | −2.8 | −2.5 | −2.8 |
| MAI Puncture Energy (J) | Before coating | 48.0 | 51 | 42.1 | 48.5 |
| | After coating | 41.2 | 46 | 38.5 | 45.5 |
| | Change % | −14.2 | −9.8 | −8.6 | −6.2 |

As shown in table 3, surprisingly, when an alicyclic hydrocarbon resin flow promoter (Arkon® P-125 and Arkon® P-140) is added into polycarbonate materials, the flowability is increased to some extent (for example, comparison between Inventive Example 1 and Comparative Example 5). More importantly, the coating resistance is significantly improved. For toughened polycarbonates (to which an impact modifier is added), the coating resistance is also significantly improved by alicyclic hydrocarbon resins, for example, as can be clearly seen from the comparisons between Inventive Examples 1-4 and Comparative Examples 4-8. At the same time, as can be seen from the data on the IZOD notched impact strength at 23° C. and −20° C., the influence of the alicyclic hydrocarbon resins on the notched impact strength is very limited when no impact modifier is used. According to the comparison of the inventive examples and the comparative examples, no obvious adverse effect on IZOD notched impact strength is observed when MBS (Kane Ace M732), a silicone/acrylate rubber-based impact modifier (Metablen S-2001), and an acrylate rubber-based impact modifier (Paraloid EXL2311) were used in combination.

Since coating materials contain some chemical solvents which are harmful to polycarbonate such as methyl isobutyl ketone, ethyl benzene, ethyl acetate, acetic acid butyl ester, toluene, xylene, etc., the result that the polycarbonate composition of the present invention can succeed in passing the coating resistance test, on the other hand, also confirms the chemical resistance of the articles comprising the composition of the present invention.

All these results demonstrate that polycarbonate compositions according to the present invention have good coating resistance, chemical resistance and impact properties as well as better flowability. Thus, articles comprising the compositions according to the present invention satisfy the requirement for coating processes and are suitable for processing large parts and/or thin-wall articles under higher working temperatures.

The invention claimed is:

1. A polycarbonate composition comprising the following components:
   A) from 75 wt.-% to 97.5 wt.-% of a polycarbonate,
   B) from 1.5 wt.-% to 15 wt.-% of a flow promoter selected from the group consisting of alicyclic hydrocarbon resins, and
   C) from 1 wt.-% to 15 wt.-% of an impact modifier, the impact modifier being one or more selected from the group consisting of
      methyl methacrylate and/or methyl methacrylate-styrene copolymer grafted butadiene- and/or styrene-butadiene rubber-based impact modifiers having a core-shell structure,
      siloxane-acrylate rubbers having a core-shell structure, and
      acrylate rubber-based core-shell impact modifiers,
   wherein the composition comprises no polycarbonate-polysiloxane copolymer.

2. The polycarbonate composition according to claim 1, wherein the alicyclic hydrocarbon resin has a number average molecular weight ($M_n$) of from 500 to 5,000 g/mol, as determined by GPC in chloroform using monodisperse molecular weight polystyrene standard.

3. The polycarbonate composition according to claim 1, wherein the alicyclic hydrocarbon resin has a number average molecular weight ($M_n$) of from 850 to 1,500 g/mol as determined by GPC in chloroform using monodisperse molecular weight polystyrene standard.

4. The polycarbonate composition according to claim 1, wherein the alicyclic hydrocarbon resin is a hydrocarbon resin derived from unsaturated $C_5$ to $C_9$ monomers.

5. The polycarbonate composition according to claim 1, wherein the composition comprises an alicyclic saturated hydrocarbon resin having the following structural unit (3):

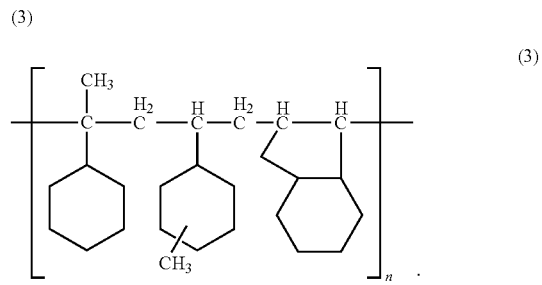

(3)

6. The polycarbonate composition according to claim 5, wherein the polymerization degree n in structural unit (3) is from 2 to 8.

7. The polycarbonate composition according to claim 5, wherein the polymerization degree n in structural unit (3) is 3.

8. The polycarbonate composition according to claim 1, wherein the composition comprises from 1 wt.-% to 8 wt.-% of an impact modifier.

9. The polycarbonate composition according to claim 1, wherein the composition comprises no polycarbonate-copolymer.

10. The polycarbonate composition according to claim 1, wherein the composition does not contain any polyester and/or further flow promoters than component B.

11. The polycarbonate composition according to claim 1, wherein the composition consists of A) from 75 wt.-% to 97 wt.-% of an aromatic polycarbonate,
B) from 1.5 wt.-% to 15 wt.-% of a flow promoter selected from the group consisting of alicyclic hydrocarbon resins,
C) from 1 wt.-% to 15 wt.-% of an impact modifier, the impact modifier being one or more selected from the group consisting of methyl methacrylate and/or methyl methacrylate-styrene copolymer grafted butadiene- and/or styrene-butadiene rubber-based impact modifiers having a core-shell structure, siloxane-acrylate rubbers having a core-shell structure, and acrylate rubber-based core-shell impact modifiers, and
D) from 0.5 wt.-% to 15 wt.-% of one or more conventional additives selected from the group consisting of mold release agents, flame retardants, fillers, anti-oxidants, heat stabilizers, antistatic agents, colorants, pigments, UV absorbers, and IR absorbers.

12. An article comprising the polycarbonate composition according to claim 1.

13. The article according to claim 12 comprising one or more coating layers.

14. The article according to claim 12, wherein the article is a plastic part of a mobile phone, a laptop, an adaptor, charger, socket or switch.

* * * * *